Figure 3:
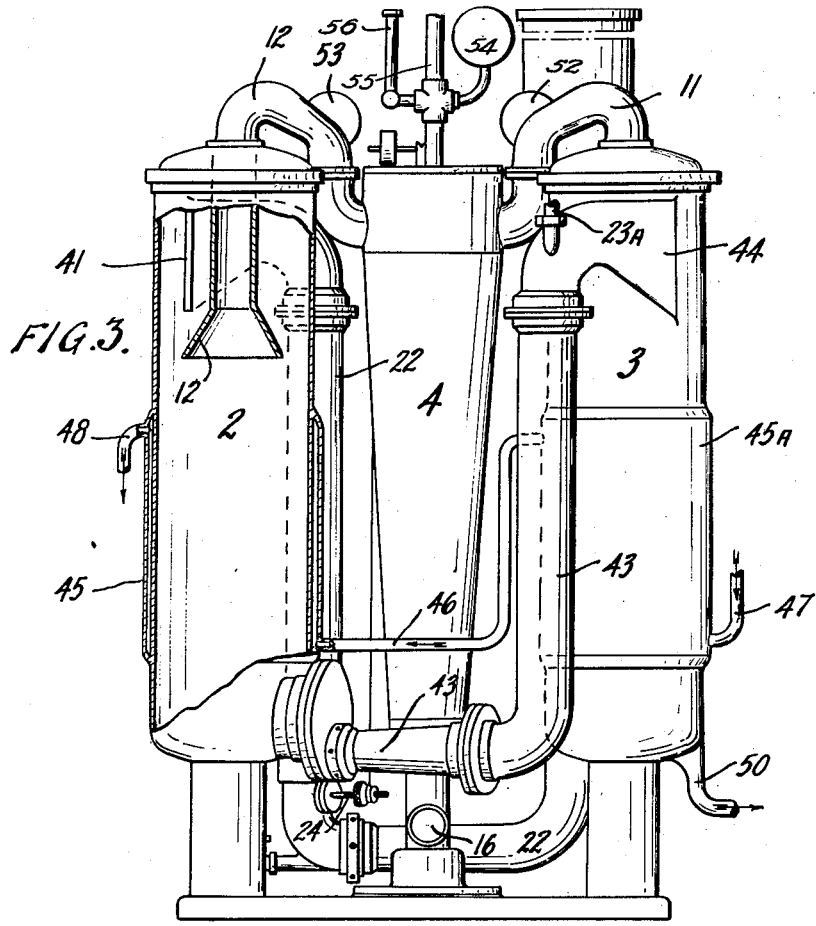

March 23, 1943.  H. L. MURRAY  2,314,455
APPARATUS FOR PASTEURIZING AND/OR DEODORIZING
AND COOLING LACTEAL LIQUIDS UNDER VACUUM
Filed Feb. 17, 1939    3 Sheets-Sheet 1
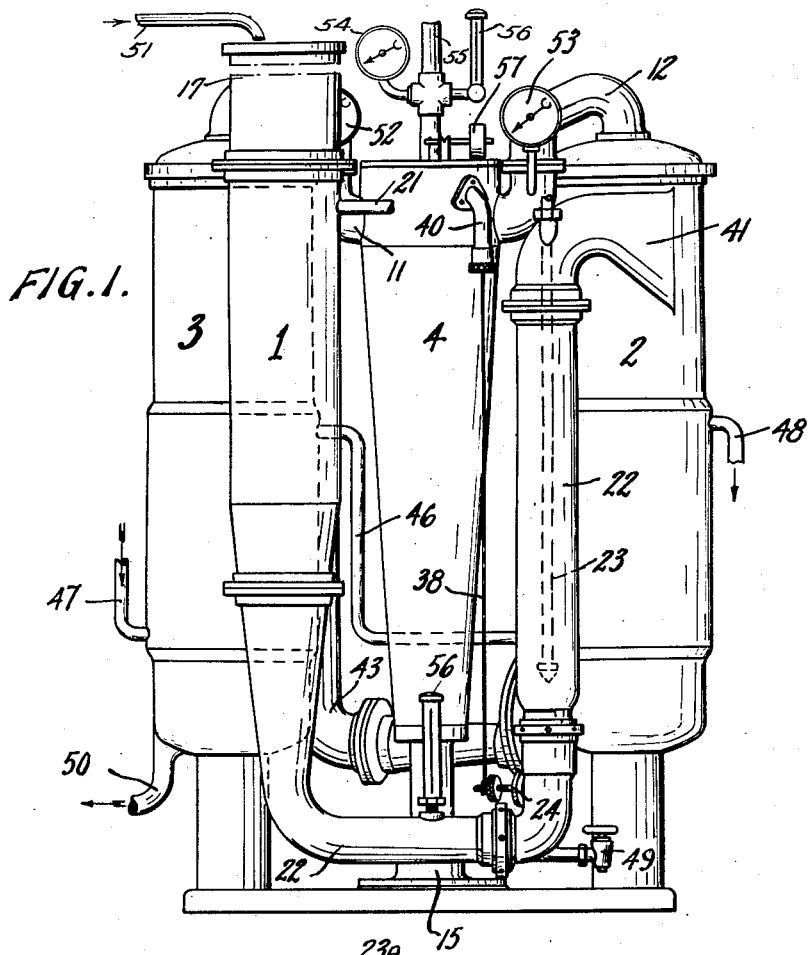
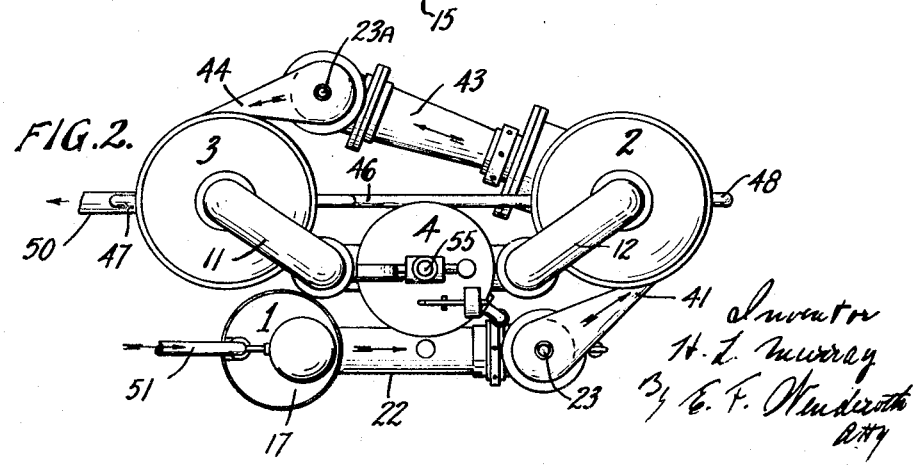

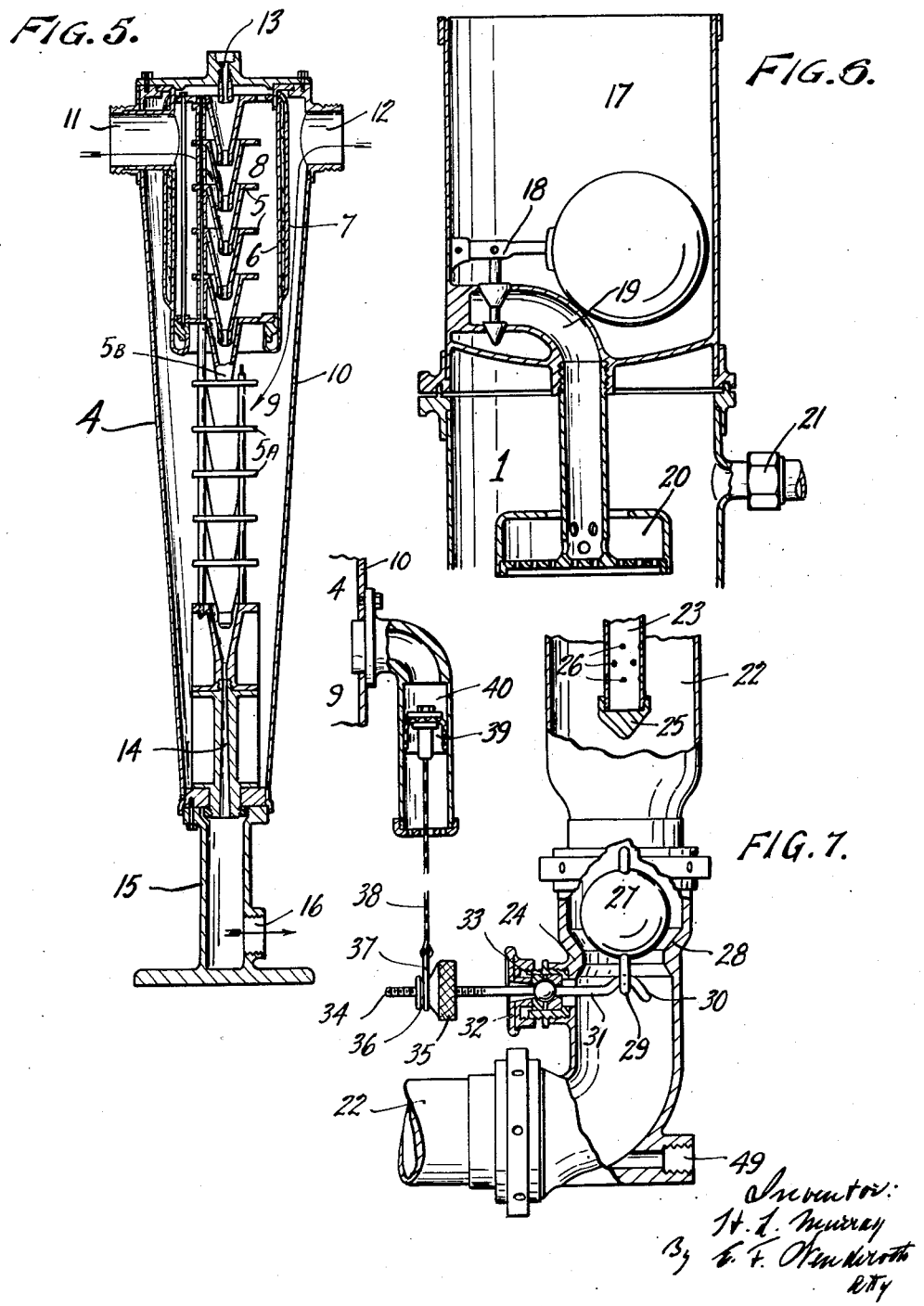

Patented Mar. 23, 1943

2,314,455

UNITED STATES PATENT OFFICE 2,314,455

APPARATUS FOR PASTEURIZING AND/OR DEODORIZING AND COOLING LACTEAL LIQUIDS UNDER VACUUM

Henry Lamont Murray, Parnell, Auckland, New Zealand, assignor to Murray Deodorizers Limited, Auckland, New Zealand, a company of New Zealand Application February 17, 1939, Serial No. 257,013
In Australia February 22, 1938

10 Claims. (Cl. 99—251).

This invention relates to apparatus for pasteurizing and/or deodorizing and cooling cream. The primary objects of the invention are the provision of an improved apparatus which will permit combining into one compact unit the separate, although connected, units. This permits appreciably reduced production costs, less floor space and yet easy, effective and uniform control of the apparatus.

At the present time, known pasteurizers and deodorizers are coupled together to operate as a unit, which unit comprises apparatus having a condenser common to both parts thereof. To these vacuum coolers are connected as separate pieces of apparatus, having independent condensers, at the outlet of the deodorizer; and whereas such apparatus operates effectively, the floor space occupied is appreciable and the apparatus is more complicated and expensive to manufacture and operate than is desirable.

It having been recognized that the provision of two condensers (one for the deodorizer and the other for the cooler) adds appreciably to the cost of the apparatus, increases the factors requiring attention in operation, and also adds to the running and power costs, various attempts have been made in the past to make one condenser effective for the two pieces of apparatus. However, until the improved condenser of my present invention was devised, the previously known condenser could not be satisfactorily and cheaply adapted to this use without involving the provision of special and complicated mechanism, so that the desired high vacuum could be applied to the cooler and the desired low vacuum could be applied to the deodorizer.

The discovery of the possibility of simultaneously obtaining different degrees of vacuum from the one condenser has enabled the previously separate units of apparatus to be combined into one compact apparatus which is not only much cheaper, but is also more economical to run and easier to control.

Broadly speaking, therefore, the present invention may be said to comprise the provision, in apparatus for deodorizing and cooling lacteal liquids, of a single condenser which is capable of applying different degrees of vacuum to the deodorizer and to the cooler.

The invention may be said to further comprise the provision, in apparatus for deodorizing, cooling and pasteurizing lacteal liquids of a single condenser which is capable of applying different degrees of vacuum to the deodorizer and to the cooler, and also to the pasteurizer through the deodorizer.

In addition to these combinations, the invention also includes features which will be more particularly pointed out in the claims.

In describing the invention reference will be made to the accompanying drawings, in which Fig. 1 shows a front elevation of the complete apparatus combining the pasteurizer, deodorizer and cooler, Fig. 2 is a plan view of Fig. 1, Fig. 3 is a rear elevation of the apparatus with the deodorizer partly in section.

Figure 4:
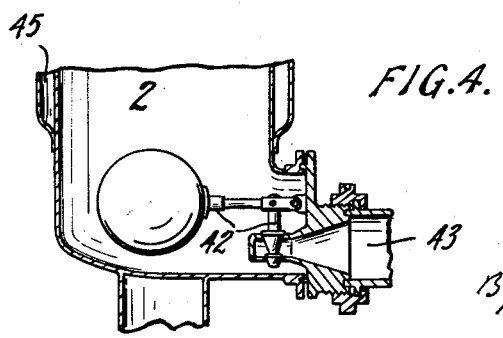

Fig. 4 is an enlarged sectional elevation of the deodorizer at its bottom to show the float valve, Fig. 5 is an enlarged sectional elevation of the compound condenser, Fig. 6 is an enlarged sectional elevation of the upper portion of the pasteurizer, and Fig. 7 is an enlarged sectional elevation of the equilibrium valve and its control mechanism.

The complete apparatus of the invention comprises three vertical cylindrical vessels or containers, namely the pasteurizer 1, the deodorizer 2 and the cooler unit 3, which are so mounted to a base as to be disposed around the improved compound ejector condenser 4. This condenser, while of the cone type, is now modified to enable a different degree of vacuum to be obtained therefrom for the deodorizer 2 which is different from that obtained for the cooler 3. These modifications comprise (see Fig. 5) isolating a number of the upper cones 5 by surrounding them by such means as a cylindrical partition 6 which in turn is surrounded by an insulating wall 7, such partition 6 causing the upper cones 5 to be contained within an upper chamber. The last cone 5B in said chamber serves as a seal within the two chambers 8 and 9. Chamber 8 is separated from the main chamber 9, the latter being enclosed by the main tapered outer wall 10 and being under the influence of the lower cones 5A.

A vapour pipe 11 passes from the upper chamber 8 to the top of the cooler unit 3, and a similar vapour pipe 12 passes from the main chamber 9 to the top of the deodorizer 2. The pressure water jet which passes through all of the cones 5 and 5A from the upper nozzle 13 is discharged through the discharge throat 14 and the pedestal pipe 15 in which is provided the outlet 16 to the drain.

While continuing to isolate the upper set of cones from the lower set, the apparatus may be varied in several ways in cases where extra large capacity for evacuation is desired. For instance, since it is impractical to unreasonably increase the diameter of the jet and cones when increased capacity is desired (this being due to the fact that the centre of a thick jet of water does not exercise effective condensing action in its exceedingly rapid transit through the cones) there could be provided two, three or more vertical sets of cones each having their own jets of water, the upper sets of cones all evacuating upper chamber 8, and the lower cones all evacuating the main chamber 9.

Furthermore, the apparatus as shown in Fig. 5 may be such that the upper chamber 8 is not surrounded by main chamber 9, these chambers 8 and 9 being disposed one above the other, and a pipe extending up from the main chamber 9 or in any other manner applied to bring it in line with the vapour pipe 11 (if desired). This obviously is not an essential requirement, but is expedient only in order to provide similarity between the connections from the condenser 4 to the cooler 3 and to the deodorizer 2.

The pasteurizer 1, deodorizer 2 and cooler unit 3 have different internal and external fittings which enable each unit to effect its own particular function, the one condenser 4 applying vacuum to each of said units although in different degrees. For instance, in the case of the treatment of cream, the condenser 4 may be called upon to apply say six inches of vacuum to the pasteurizer 1, say fifteen inches to the deodorizer 2 and a maximum obtainable of say twenty-nine inches to the cooler 3.

In the case of the cooler 3 and deodorizer 2, their different degrees of vacuum are obtained by their separate vapour pipe connections 11 and 12 to the upper and lower sets of cones 5 and 5A as previously referred to, but with the pasteurizer certain special apparatus is called for in order to obtain a substantially constant and even degree of vacuum therein. This is because said pasteurizer 1 obtains its degree of vacuum through the deodorizer 2.

Such pasteurizer is preferably similar to the type described in previous United States Letters Patent No. 2,091,606 wherein the liquid to be pasteurized is split up into drops or rain form and falls within the pasteurizer vessel wherein it comes into direct contact with steam and absorbs heat therefrom.

The pasteurizer 1 (see Fig. 6) has the inlet tank 17, a float valve 18, and a liquid inlet pipe 19 to the top thereof, to admit the liquid to be treated to the spray ring 20 or like within the pasteurizer 1. In this manner said liquid is broken up into fine drops which fall to the bottom of the pasteurizer vessel 1. A steam inlet 21 is also provided near the top of the pasteurizer 1 and is provided with control valve means (not shown).

At the bottom of the pasteurizer 1 there is a connection such as a connecting pipe 22 (Fig. 1) passing between the pasteurizer 1 and the deodorizer 2; said connecting pipe 22 having a steam cleansing pipe 23 fitted thereto (see Fig. 1 and Fig. 7) to the deodorizer side of automatically-controlled equilibrium valve mechanism 24. The steam cleansing pipe 23 passes down to centre of the vertical portion of the connecting pipe 22 and has its end closed by a conical plug 25, there being a series of holes 26 in the side of the pipe 23 just above the plug 25.

The automatically-controlled valve mechanism 24 is special and important in that its function is to control the degree of vacuum applied in the pasteurizer 1. This vacuum is obtained from the greater degree of vacuum applied withing the deodorizer 2, the vacuum of the pasteurizer 1 being obtained through the connecting pipe 22.

The automatically-controlled valve mechanism 24 comprises (see Fig. 7) a bomb type valve 27 disposed on a seat 28 within the connecting pipe 22 so as to be subject at its seating 28 to the action of the vacuum applied within the deodorizer 2. This valve 27 has a loop 29 at its bottom through which the inner end 30 of a lever 31 engages, this lever 31 having a ball pivot 32 engaged within a socket 33 disposed in the connecting pipe wall. The outer end 34 of the lever 31 is threaded to take an adjustment nut 35. In a groove 36 of this nut a ring 37 is engaged, from which a flexible connection such as a flexible Bowden wire or like 38 passes upward to a piston 39 disposed within a cylinder 40 which is connected to the condenser 4 in such a position that the portion of the cylinder 40 above piston 39 is subjected to the vacuum within the main chamber 9 of said condenser 4, that is, the same as in the deodorizer 2.

The connecting pipe 22 (Fig. 1) passes upwardly and is then bent to pass tangentially and in fish-tail shape 41 into the deodorizer 2 in such manner as to direct the liquid towards the deodorizer inner wall so that said liquid will travel in film form spirally down within the said deodorizer 2.

At the bottom of the deodorizer 2, a float-operated outlet valve 42 (see Fig. 4) is provided to control flow of liquid therefrom into the connecting pipe 43 (Fig. 3) passing between the deodorizer 2 and the cooler 3. This connecting pipe 43 passes upwardly and is then bent to pass tangentially and in fish-tail shape 44 into the cooler 3 in such manner as to direct the liquid towards the cooler inner wall so that the said liquid will travel in film form spirally down within said cooler 3. Said connecting pipe 43 if desired may also have a steam cleansing pipe 23A (Fig. 2) fitted thereinto of type similar to that within the connecting pipe 22.

The vapour pipes 11 and 12 project downward into the cooler unit 3 and into the deodorizer 2 as shown in Fig. 3 in respect of the deodorizer 2, so as to minimize the possibility of liquid being drawn to the ejector condenser 4. To this end lower zones of the deodorizer 2 and the cooler 3 have surrounding water jackets 45 and 45A (Fig. 3) connected to each other by pipe 46, and having inlet 47 and outlet 48.

The connecting pipes 22 and 43 between the pasteurizer 1 and the deodorizer 2 and between the latter and the cooler are provided with drain cocks 49 (Figs. 1 and 7), the bottom of the cooler 3 having a main outlet pipe 50 which passes to the usual pump means which withdraws the treated liquid from the plant.

The liquid to be treated is admitted to the float tank 17 through inlet pipe 51 (Fig. 1), vacuum gauges 52 and 53 being fitted to the vapour pipes 11 and 12 to indicate the degrees of vacuum in the cooler 3 and deodorizer 2, a pressure gauge 54 being also fitted to the pressure water inlet pipe 55 (Fig. 1) of the nozzle 13 (Fig. 5) of the condenser 4. Various thermometers 56 are also applied at desired points and a snifter valve 57 is mounted on the condenser 4 at its main chamber 9.

In operation, considering the liquid it is desired to treat to be cream, it is necessary to sterilize the whole apparatus. To do this, steam is admitted through inlet 21 on the pasteurizer 1 and through cleansing pipes 23 and 23A on connecting pipes 22 and 43, the steam being allowed to flow at random through the apparatus.

Having first effected sterilization, the ejector condenser 4 is then started up by passing water under pressure through nozzle 13. This creates a vacuum extending through the respective vapour pipes 11 and 12 to the cooler 3 and the deodorizer 2, the former having say 29 inches of vacuum applied thereto and the latter say 15 inches due to their connection to separate sets of condenser cones 5 and 5A. The deodorizer vacuum in the deodorizer is governed by the snifter valve 57.

The condenser 4 gives the greater degree of vacuum in the chamber 8 surrounding the upper cones 5 due to the fact that the water on passing through such upper cones 5 will be colder and have a greater condensing effect on the vapours drawn to chamber 8 than it will on the vapours in main chamber 9 on passing through the lower cones 5A.

For pasteurizing the cream, the equivalent vacuum for correct pasteurizing temperature is say 6 inches and in order to obtain this degree and substantially maintain the same it is then necessary to adjust the automatic equilibrium control valve mechanism 24.

The vacuum of the deodorizer 2 as transmitted through the connecting pipe 22 tends to lift the equilibrium valve 27 (see Fig. 7) from its seat 28. However the vacuum within chamber 9 of the condenser 4 as transmitted to the piston 39 provides resistance to the lifting of the valve 27, this resistance being transmitted through the Bowden wire 38 and the lever 31 which is connected to the bottom of the valve 27.

Movement of the adjustment nut 35 on lever 31 therefore enables a ratio to be obtained between the area of the piston 39 and the area of the valve seat 28 so that the adjustment obtained will cause the vacuum in the pasteurizer 1 to be held stable at any desired degree in relation to the degree of vacuum in the deodorizer 2. Valve 27 remains open until the condenser chamber 9 is energized. The valve then assumes its adjusted equilibrium position, providing just sufficient area between it and its seat 28 for the passage of the vapourous cream while maintaining constant the degree of vacuum desired in the pasteurizer.

Steam being admitted to the pasteurizer 1 through steam inlet 21 and cream being admitted to the inlet tank 17 of said pasteurizer 1 through inlet pipe 51, said cream while it is raining down from spray ring 20, comes into direct contact with the steam within the pasteurizer. By such contact the steam acquires pasteurizing temperature by condensing the steam. The cream reaches the bottom of the pasteurizer in a boiling state at the desired temperature and is drawn past the equilibrium valve 27 to the deodorizer 2 due to the fact that there is say 15 inches of vacuum in the deodorizer 2 as compared with say 6 inches in the pasteurizer 1.

On passing the valve 27, additional steam for processing the cream may be admitted thereto if desired by the steam cleanser 23, the steam and cream passing up the connecting pipe 22 at high velocity and through fish tail 41 into the deodorizer 2. There the cream spirals down the internal wall while subjected to the 15 inches of vacuum, the cyclonic spiralling action causing separation of the vapours from the cream in the manner as has been described in previous patent specifications.

The cream accumulating at the bottom of the deodorizer 2 causes a liquid seal between the deodorizer 2 and the cooler 3 at all times, the float valve 42 (Fig. 4) controlling the flow of liquid from the deodorizer 2 to the cooler 3 and maintaining the liquid seal, such flow being caused because of the greater vacuum within the cooler 3.

The cream while passing through the connecting pipe 43 between the deodorizer 2 and the cooler 3 may be subjected to steam cleansing by steam cleanser 23A, the cream entering the cooler 3 through fish tail 44 and spiralling down the internal wall while subjected to the 29 inches of vacuum, the vapours being expelled by cyclonic force as in deodorizer 2.

The spiralling action of the cream down the internal walls of the cooler 3 is similar to that effected in the deodorizer 2 but as there is a greater degree of vacuum within the cooler 3, the extracting effect on the vapours is greater, the cream dropping in temperature to that equivalent to the negative pressure of the cooler.

The cream on reaching the bottom of the cooler 3 is removed therefrom through main outlet pipe 50 by pumping in the usual way, the cooling water jackets 45 and 45A of the deodorizer 2 and cooler 3 consolidating the liquid after deodorizing and after cooling.

The combination of apparatus will not necessarily include the pasteurizer 1 of vacuum type in that it is known to apply pasteurizers of atmospheric type to deodorizers, and accordingly, the pasteurizer may or may not be subjected to the vacuum from the deodorizer although such arrangement is preferable to facilitate the control of pasteurizing temperature by vacuum control.

I claim:

1. Apparatus for flash pasteurizing lacteal fluids by continuous process, comprising a vacuum flash pasteurizer in which the lacteal fluid is intimately intermingled with steam; a vacuum deodorizer and a vacuum cooler, all disposed serially and in connection with one another; and a multi-stage condenser, capable of simultaneously producing therein different degrees of vacuum, which different degrees of vacuum are directly impressed by separate ports upon said deodorizer and cooler, respectively; and means between said deodorizer and said pasteurizer for impressing on the pasteurizer a determined fractional part of the vacuum prevailing in the deodorizer, the degrees of vacuum being at least such that the fluid is vacuum-pulled from one of the serially-connected units to the next succeeding one.

2. Apparatus for the continuous pasteurization of lacteal fluid, comprising a vacuum flash pasteurizer in which the lacteal fluid is flash-pasteurized by intimately intermingling it with steam; a vacuum deodorizer; and a vacuum cooler, all connected together in series; and a multi-chambered condenser, each chamber of which develops a different degree of vacuum, the chambers of the condenser being directly and freely connected to the deodorizer and cooler, respectively, so as to impress the higher degree of vacuum on the cooler, the degree of vacuum being at least sufficient to pull the lacteal fluid from one element to the next.

3. Apparatus for the continuous treatment of lacteal fluids, comprising a vacuum deodorizer and a vacuum cooler connected in series; and a two chambered condenser capable of generating a different degree of vacuum in each said chamber, and connected directly, the chamber of lower vacuum to the deodorizer, and the chamber of higher vacuum to the cooler; the vacuum pulling the lacteal fluid from the deodorizer into the cooler.

4. Apparatus for flash pasteurizing lacteal fluids by continuous process, comprising a vacuum flash pasteurizer in which the lacteal fluid is intimately intermingled with steam; a vacuum deodorizer and a vacuum cooler, all disposed serially and in connection with one another; and a condenser, connected with said deodorizer and cooler, respectively, to impress directly and simultaneously thereon different degrees of vacuum; and means between said deodorizer and said pasteurizer for impressing on the pasteurizer a determined fractional part of the vacuum prevailing in the deodorizer, the degrees of vacuum being at least such that the fluid is vacuum-pulled from one of the serially-connected units to the next succeeding one.

5. Apparatus for flash pasteurizing lacteal fluids by continuous process, comprising a vacuum flash pasteurizer in which the lacteal fluid is intimately intermingled with steam, a vacuum deodorizer and a vacuum cooler, all disposed serially and in connection with one another, a condenser connected with said deodorizer and cooler, respectively, to impress directly and simultaneously thereon different degrees of vacuum, and an adjustable equilibrium valve means between said deodorizer and said pasteurizer for impressing on the pasteurizer a determined fractional part of the vacuum prevailing in the deodorizer, the degrees of vacuum being at least such that the fluid is vacuum-pulled from one of the serially-connected units to the next succeeding one.

6. Apparatus for flash pasteurizing lacteal fluids by continuous process, comprising a vacuum flash pasteurizer in which the lacteal fluid is intimately intermingled with steam; a vacuum deodorizer and a vacuum cooler, all disposed serially and in connection with one another; and a condenser, connected with said deodorizer and cooler, respectively, to impress directly and simultaneously thereon different degrees of vacuum; means between said deodorizer and said pasteurizer for impressing on the pasteurizer a determined fractional part of the vacuum prevailing in the deodorizer, the degrees of vacuum being at least such that the fluid is vacuum-pulled from one of the serially-connected units to the next succeeding one, and a float-operated outlet valve disposed between said deodorizer and said cooler for maintaining constantly a liquid seal in the deodorizer and permitting flow to the cooler only when the liquid in the deodorizer reaches a predetermined level.

7. Apparatus for flash pasteurizing lacteal fluids by continuous process, comprising a vacuum flash pasteurizer in which the lacteal fluid is intimately intermingled with steam; a vacuum deodorizer and a vacuum cooler, all disposed serially and in connection with one another; and a condenser, connected with said deodorizer and cooler, respectively, to impress directly and simultaneously thereon different degrees of vacuum; means between said deodorizer and said pasteurizer for impressing on the pasteurizer a determined fractional part of the vacuum prevailing in the deodorizer, the degrees of vacuum being at least such that the fluid is vacuum-pulled from one of the serially-connected units to the next succeeding one, and cold water jackets surrounding the lower portions of the deodorizer and cooler to facilitate condensing action therein.

8. Apparatus for flash pasteurizing lacteal fluids by continuous process, comprising a vacuum flash pasteurizer in which the lacteal fluid is intimately intermingled with steam; a vacuum deodorizer and a vacuum cooler, all disposed serially and in connection with one another; and a condenser, connected with said deodorizer and cooler, respectively, to impress directly and simultaneously thereon different degrees of vacuum; means between said deodorizer and said pasteurizer for impressing on the pasteurizer a determined fractional part of the vacuum prevailing in the deodorizer, the degrees of vacuum being at least such that the fluid is vacuum-pulled from one of the serially-connected units to the next succeeding one, and a discharge pump for discharging the treated fluid from the vacuum cooler to the atmosphere.

9. Apparatus for flash pasteurizing lacteal fluids by continuous process, comprising a vacuum flash pasterizer in which the lacteal fluid is intimately intermingled with steam; a vacuum deodorizer and a vacuum cooler, all disposed serially and in connection with one another; and a condenser, connected with said deodorizer and cooler, respectively, to impress directly and simultaneously thereon different degrees of vacuum; means between said deodorizer and said pasteurizer for impressing on the pasteurizer a determined fractional part of the vacuum prevailing in the deodorizer, the degrees of vacuum being at least such that the fluid is vacuum-pulled from one of the serially-connected units to the next succeeding one, and fluid-sealed supply mechanism for controlling the influx of lacteal fluid to the intake end of the pasteurizer capable of providing a constant fluid supply under combined action of gravity and the vacuum maintaining within the pasteurizer.

10. Apparatus for flash pasteurizing lacteal fluids by continuous process, comprising a vacuum flash pasteurizer in which the lacteal fluid is intimately intermingled with steam; a vacuum deodorizer and a vacuum cooler, all disposed serially and in connection with one another; and a condenser, connected with said deodorizer and cooler, respectively, to impress directly and simultaneously thereon different degrees of vacuum; means between said deodorizer and said pasteurizer for impressing on the pasteurizer a determined fractional part of the vacuum prevailing in the deodorizer, the degrees of vacuum being at least such that the fluid is vacuum-pulled from one of the serially-connected units to the next succeeding one, a float-operated outlet valve disposed between said deodorizer and said cooler for maintaining constantly a liquid seal in the deodorizer and permitting flow to the cooler only when the liquid in the deodorizer reaches a predetermined level, cold water jackets surrounding the lower portions of the deodorizer and cooler to facilitate condensing action therein, a discharge pump for discharging the treated fluid from the vacuum cooler to the atmosphere, and fluid-sealed supply mechanism for controlling therein flow of lacteal fluid to the intake end of the pasteurizer capable of providing a constant fluid supply under combined action of gravity and the vacuum maintaining within the pasteurizer.

HENRY LAMONT MURRAY.